April 7, 1964

R. E. SCOTT ETAL 3,128,450

MACH NUMBER INDICATING AND COMPUTING MEANS

Filed Jan. 4, 1960

ROBERT E. SCOTT
JOHN P. KEMMER
*INVENTORS.*

BY Lyon & Lyon

ATTORNEYS.

United States Patent Office 3,128,450
Patented Apr. 7, 1964

3,128,450
MACH NUMBER INDICATING AND
COMPUTING MEANS
Robert E. Scott, Los Angeles, and John P. Kemmer, Woodland Hills, Calif., assignors, by mesne assignments, to Litton Industries, Inc., Beverly Hills, Calif., a corporation of Delaware
Filed Jan. 4, 1960, Ser. No. 378
1 Claim. (Cl. 340—149)

The present invention relates to improved means for indicating and computing pressures and particularly so in relationship to Mach numbers.

In general, the invention as disclosed herein involves the use of two pressure sources, one of which is fixed in pressure and the other one of which is variable in pressure. These pressures from the two sources are converted into corresponding voltages using conventional pressure-electric transducers. These voltages are compared in a novel manner to produce either an indication of their relative values or a computation of the variable pressure.

It is therefore an object of the present invention to provide improved means and techniques whereby the above-indicated results may be achieved.

Another object of the present invention is to provide a system of this character which effects computation of Mach number at any single point in such a manner that a relay may be actuated or a signal otherwise derived to indicate a particular condition.

Another object of the present invention is to provide an improved Mach number computing system which allows the continuous indication of the computed Mach number.

Another object of the present invention is to provide the systems of this character characterized by their simplicity and accuracy.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings in which:

Figure 1:
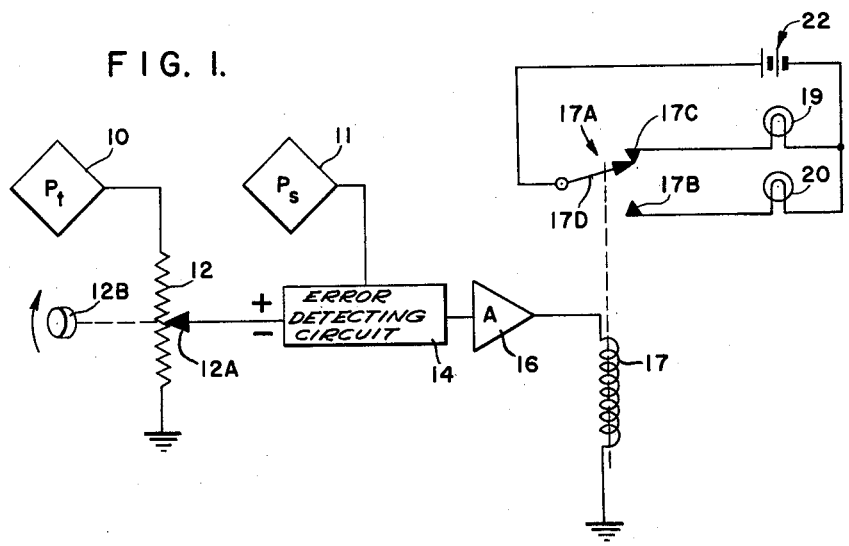
FIGURE 1 illustrates a system embodying features of the present invention for indicating a certain pressure condition.

Referring to the drawings, FIGURE 1 illustrates two pressure-electrical transducers 10 and 11 which function to produce a voltage corresponding to a corresponding pressure condition.

The transducer 10 may produce a variable voltage corresponding to a variable pressure condition indicated as $P_t$, total pressure. The other transducer 11 may produce a fixed voltage corresponding to a substantially constant pressure denoted as $P_s$, static pressure.

The voltage developed by transducer 10 is applied to one terminal of the potentiometer type resistance 12 having its other terminal grounded. The adjustable tap 12A on resistance 12 may be adjusted by the knob 12B to establish the level of voltage applied from tap 12A to one input terminal of the error-detecting circuit 14. The other input terminal of the error-detecting circuit 14 has applied thereto the voltage developed by transducer 11. These voltages developed by the transducers 10 and 11 may either be an alternating voltage of the same frequency or may be D.C. voltages.

The output of the error-detector circuit 14 is applied to the input of the phase-sensing amplifier 16 having its output coupled to the ungrounded terminal of the relay coil 17. Energization of the relay coil 17 results in operation of the single pole double throw relay switch 17A to illuminate the indicating lamp 20 when the winding 17 is energized and to illuminate the other lamp 19 when the winding 17 is de-energized as shown. For this purpose one terminal of each of the lamps 19 and 20 is connected to the corresponding relay fixed contact 17C and 17B, the other terminal of each of the lamps 19 and 20 being connected both to one terminal of the voltage source 22 having its other terminal connected to the movable switch contact 17D.

In the operation of the system shown in FIGURE 1, $P_t$ and $P_s$ represent respectively the total and static pressure taken from the pressure lines in an aircraft Pitot tube. These pressures each generate a corresponding electrical signal proportional to the pressure applied to it. The signal proportional to total pressure is applied to the Mach number setting potentiometer 12. The setting of the tap 12A, calibrated as a function of Mach number, is manually adjusted to the desired switching point. It will be observed that the electrical signal developed on the tap 12A is then the product of the set Mach number and the total pressure. This signal, represented by $kP_tM$, is compared at the error-detector circuit 14 with the signal developed by the so-called "static transducer 11." When the Mach number is less than the set Mach number, $P_s$ is greater than the product $kP_tM$ and the signal applied to the error-detector circuit 14 is of a given phase. The term $P_t$ in the above expression has reference to the voltage developed by the transducer 10 and the term $kM$ has reference to the adjusted position of tap 12A. When the flight Mach number, as measured by the transducer 10, increases beyond the set Mach number, the voltage $P_t$ increases to make the product $kP_tM$ exceed $P_s$. This condition is sent by the detection circuit 14 such that the resultant signal supplied to the amplifier 16 changes its phase by 180° (or, in the case of D.C. excitation, it will change polarity). The amplifier 16 thus detects the phase of a signal and if it is of the proper phase, it will amplify the signal sufficiently to close the relay contacts 17D, 17B at the desired Mach number point established by the manual setting of the tap 12A.

Figure 2:
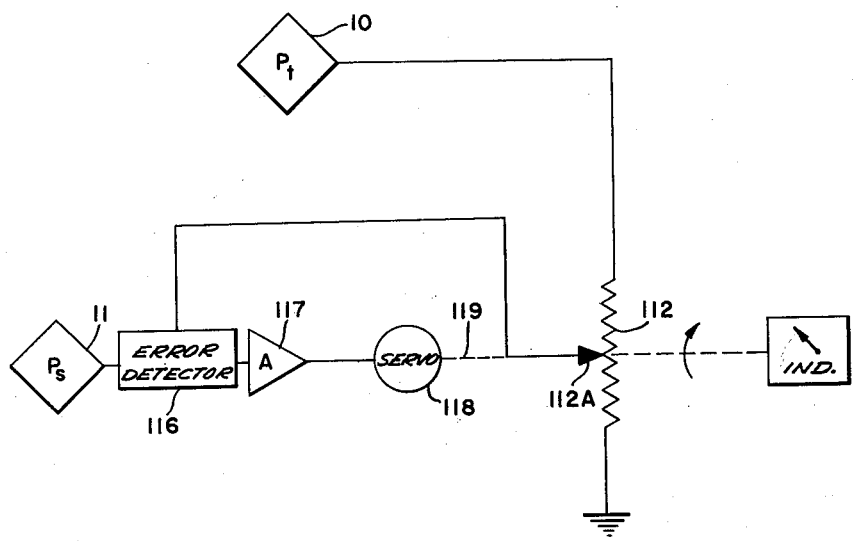
FIGURE 2 illustrates a modified form of the invention in which Mach numbers are computed continuously.

While the system thus described produces an indication when the Mach number exceeds a pre-established value, the arrangements now described in FIGURE 2, serves to produce a continuous indication of the Mach number when and as the pressure applied to the transducer 10 varies.

Thus in FIGURE 2 the electrical output of the transducer 10 represented again by $P_t$ is applied to the ungrounded terminal of the potentiometer type resistance 112. The static voltage represented by $P_s$ developed in transducer 11 is applied to one terminal of the error-detecting circuit 116 having also applied to its other input terminal a feedback voltage developed on the automatically adjusted tap 112A of resistance 112. The resultant voltage developed in the output of the error-detecting circuit 116 is applied to the input terminal of the amplifier 117 having its output coupled to the servo motor 118 for driving its output shaft which has mechanically coupled thereto the tap 112A as indicated by the dashed line 119. In this case, the position of the tap 112A which may have suitably connected thereto an indicator pointer represents the pressure sensed by the transducer 10.

Thus it will be clear that the arrangement shown in FIGURE 2 serves to compute the Mach number continuously as a function of pressure since the amplified error signal developed at the output of the amplifier 117 serves to drive the servo motor 118 which, in turn, drives the tap 112A to null the error signal. It is preferred to use a non-linear type potentiometer as potentiometer 112, such that the tap 112A is moved and positioned linearly with respect to the measured or computed Mach number. Thus in a rotary type of potentiometer the shaft angle is directly proportional to Mach number. For the purpose of the signal point Mach number computer or indicator shown in FIGURE 1, a non-linear potentiometer is not necessary, since the Mach number setting dial may be made non-linear to encompass the desired range of Mach number settings.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

We claim:

Apparatus for comparing the relative pressure ratio of two pressure transducers to a preselected ratio and indicating the result of such comparison comprising: first and second pressure sensitive electrical transducers each effective to develop a voltage in response to pressure, phase comparison means for comparing two applied voltages and developing a signal indicative of the relative magnitude of said voltages, means for applying a preselected fraction of the voltage developed by said first transducer to said phase comparison means, means for applying the voltage developed by said second transducer to said phase comparison means, and indicating means responsive to the signal developed by said phase comparison means for producing a first indication when the preselected fractional voltage applied to said phase comparison means is greater than the voltage developed by said second transducer and a second indication when the preselected fractional voltage applied to said phase comparison means is less than the voltage developed by said second transducer.

References Cited in the file of this patent

UNITED STATES PATENTS

| | | |
|---|---|---|
| 2,454,807 | Kennedy | Nov. 30, 1948 |
| 2,613,350 | Kellogg | Oct. 7, 1952 |
| 2,671,620 | Andrews | Mar. 9, 1954 |
| 2,734,736 | Payne | Feb. 14, 1956 |
| 2,762,993 | Sedgfield | Sept. 11, 1956 |
| 2,770,772 | Foulkes et al. | Nov. 13, 1956 |
| 2,802,174 | Staunton | Aug. 6, 1957 |
| 2,808,564 | Brandt et al. | Oct. 1, 1957 |
| 2,869,367 | Moore | Jan. 20, 1959 |
| 2,923,884 | Moss | Feb. 2, 1960 |
| 2,958,823 | Rabier | Nov. 1, 1960 |

FOREIGN PATENTS

| | | |
|---|---|---|
| 796,910 | Great Britain | June 18, 1958 |